(Model.)
F. WILSON.
DRIVE CHAIN.
No. 310,104. Patented Dec. 30, 1884.
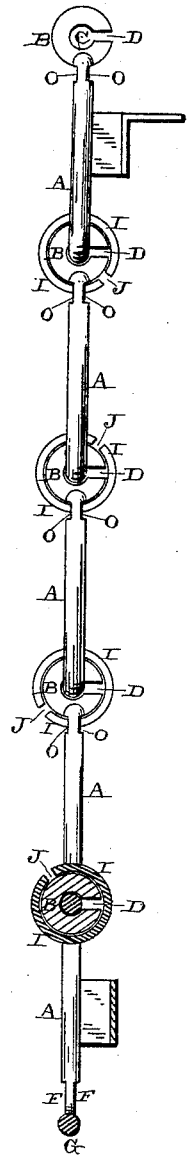
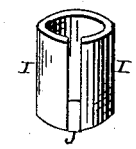
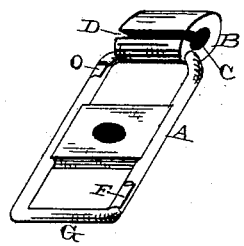
Witnesses.
Louis F. Gardner
A. S. Pattison
Inventor.
F. Wilson,
per
F. A. Lehmann,
atty.

UNITED STATES PATENT OFFICE.

FULLERTON WILSON, OF WASHINGTON COURT-HOUSE, OHIO.

DRIVE-CHAIN.

SPECIFICATION forming part of Letters Patent No. 310,104, dated December 30, 1884.

Application filed April 30, 1884. (Model.)

*To all whom it may concern:*

Be it known that I, FULLERTON WILSON, of Washington Court-House, in the county of Fayette and State of Ohio, have invented certain new and useful Improvements in Drive-Chains; and I do hereby declare the following to be a full, clear, and exact description of the invention, such as will enable others skilled in the art to which it pertains to make and use it, reference being had to the accompanying drawings, which form part of this specification.

My invention relates to an improvement in drive-chains; and it consists, first, in a slotted friction-roller, which serves both as a friction-roller while the chain is bearing upon any surface and also a lock to prevent the links from becoming accidentally detached at any time; second, in the combination of the links having an enlarged slotted head or cylinder formed upon one end with a slotted friction-roller which is placed upon this slotted head, the links being reduced in size at those points where they pass through the slots of both the head and the friction-roller, as will be more fully described hereinafter.

The object of my invention is to construct a drive-chain in which the links are provided with rollers, so that when the chain is moving on a plane or incline it rolls upon the rollers, thus requiring much less expenditure of power to drive the conveyer than is the case where chains are dragged upon their flat surface, and to construct a chain which is much lighter than the chains of the ordinary construction, and yet will do the same work.

Figure 1 is a side elevation of a section of a chain embodying my invention. Fig. 2 is a detached view of one of the slotted rollers. Fig. 3 is a perspective of one of the links detached.

A represents the links of a drive-chain, which will be of any desired length, size, or shape that may be preferred, and which has an open-head hook, B, secured upon one end. This head is secured rigidly to one end of the link, is made circular in shape, and has the longitudinal opening C through its center and the slot D through one side. This slot extends from side to side and communicates with the opening C, as shown. At or near the opposite end of each link there are two recesses, F, cut in opposite sides of the side of the link, for the purpose of reducing the link in thickness at this point, so that the reduced portion slips freely through the slot. The end G of the link fits in the opening C, which is made longitudinally through the head, and turns freely therein.

Slipped or passed over the chain heads or cylinders B is a friction-roller, I, of any suitable thickness, and which has a slot, J, through one side, which slot J corresponds to the slot D, made through the side of the head. This friction-roller serves the double purpose of a friction-roller for easing the friction of the chain when it is being dragged upon a flat or inclined surface, and as a sort of safety lock or guard, for the purpose of preventing any possibility of any of the links becoming loosened at any time. In order to place these friction-rollers upon the heads, each link has a narrow recess, O, cut in opposite sides at that end of the link to which the head is secured, and before the roller can be detached the link which is connected with the head B must be removed. This can only be done by first turning the slot of the friction-roller directly in a line with the slot in the head, and then the link is turned at an angle, so that the reduced part can be slipped endwise through both slots at once. After the link has once been detached, then it is only necessary to turn the slot of the friction-roller in line with the reduced part, which is formed by the recess O, when the roller can be removed from the chain. As the rollers serve to decrease friction when the chain is being dragged along on a plane or inclined surface, much less power is required to move the chain, and hence the links of the chain can be made much lighter, because the strength of the chain is not exhausted in dragging its own weight. These rollers serve as safety-locks for the links, because before one of the links can be displaced its slot must be brought into a direct line with the slot in the head, and as these slots are seldom or never in line with each other long enough to allow the link to become detached, even intentionally, it will readily be seen that there is no possibility of one of the links becoming loose. Every second, third, fourth, or fifth link will be provided with suitable means for attaching a portion of the conveyer to it, and this means may be varied, as shown in Fig. 1.

I do not limit myself to any manner of attaching the parts together, for this may be varied at will.

Having thus described my invention, I claim—

1. The combination of the link A, having the cut-away parts O near one corner and the cut-away parts F at or near the other corner, and provided with a slotted head, D, with a slotted friction-roller which is made to turn upon the head, substantially as shown and described.

2. The combination of the links, reduced in thickness at one end for the removal of the friction-roller, and at the other for the purpose of detaching one link from another, and provided with a slotted head, with the slotted removable friction-roller, substantially as set forth.

In testimony whereof I affix my signature in presence of two witnesses.

FULLERTON WILSON.

Witnesses:
C. H. MURRAY,
FRANK A. CHAFFIN.